US011824236B2

(12) United States Patent
Akabori et al.

(10) Patent No.: US 11,824,236 B2
(45) Date of Patent: Nov. 21, 2023

(54) FUEL CELL SYSTEM

(71) Applicant: HONDA MOTOR CO., LTD., Tokyo (JP)

(72) Inventors: Sho Akabori, Saitama (JP); Shuji Sato, Saitama (JP); Tomoyuki Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 17/673,917

(22) Filed: Feb. 17, 2022

(65) Prior Publication Data

US 2022/0311026 A1 Sep. 29, 2022

(30) Foreign Application Priority Data

Mar. 24, 2021 (JP) ................. 2021-049735

(51) Int. Cl.
   *H01M 8/04119* (2016.01)
   *H01M 8/04223* (2016.01)
   *H01M 8/04746* (2016.01)
   *H01M 8/04858* (2016.01)

(52) U.S. Cl.
   CPC ..... *H01M 8/04126* (2013.01); *H01M 8/0491* (2013.01); *H01M 8/04253* (2013.01); *H01M 8/04268* (2013.01); *H01M 8/04753* (2013.01); *H01M 2250/20* (2013.01)

(58) Field of Classification Search
   CPC ......... H01M 8/04126; H01M 8/04253; H01M 8/04268; H01M 8/04753; H01M 8/0491; H01M 2250/20; H01M 8/04492; H01M 8/0432
   USPC ........................................... 429/413
   See application file for complete search history.

(56) References Cited

U.S. PATENT DOCUMENTS

| | | | | |
|---|---|---|---|---|
| 2002/0146606 | A1* | 10/2002 | Kobayashi | H01M 8/04358 429/436 |
| 2003/0190511 | A1* | 10/2003 | Yoshizawa | H01M 8/2457 429/429 |
| 2004/0142218 | A1 | 7/2004 | Kusano et al. | |
| 2004/0209140 | A1* | 10/2004 | Okazaki | H01M 8/0263 429/456 |
| 2005/0123813 | A1* | 6/2005 | Matoba | H01M 8/04097 429/442 |

(Continued)

FOREIGN PATENT DOCUMENTS

JP       2004165062 A     6/2004

*Primary Examiner* — Christian Roldan
(74) *Attorney, Agent, or Firm* — Armstrong Teasdale LLP (57) ABSTRACT

A fuel cell system includes: a reaction gas supply unit configured to supply a reaction gas to a fuel cell stack; a humidifier configured to transfer moisture from an off-gas discharged from the fuel cell stack to the reaction gas; and a controller configured to control the reaction gas supply unit so as to regulate a supply amount of the reaction gas, wherein the controller is configured to acquire a temperature of the humidifier and set the supply amount of the reaction gas based on a target power generation amount of the fuel cell stack, and in a case where the temperature of the humidifier is equal to or lower than a prescribed warm-up determination value, the controller executes warm-up control to increase the supply amount of the reaction gas as compared with a case where the temperature of the humidifier is higher than the warm-up determination value.

4 Claims, 5 Drawing Sheets

(56) References Cited

U.S. PATENT DOCUMENTS

2006/0222924 A1* 10/2006 Matsuoka ........... H01M 8/2457
429/432

* cited by examiner

FUEL CELL SYSTEM

TECHNICAL FIELD

The present invention relates to a fuel cell system.

BACKGROUND ART

JP2004-165062A discloses a humidifier that transfers moisture between a reaction gas supplied to a fuel cell stack and an off-gas discharged from the fuel cell stack and thus humidifies the reaction gas. An appropriate amount of moisture contained in the reaction gas suppresses the deterioration of the fuel cell stack. The humidifier is provided with a hot water raiser so as to increase a temperature of the reaction gas. By increasing the temperature of the reaction gas in the humidifier, the saturated vapor pressure increases, and thus the amount of moisture the reaction gas can contain increases.

However, when the hot water raiser is provided in this way, the number of parts and the weight may increase.

SUMMARY OF THE INVENTION

In view of the above background, an object of the present invention is to provide a fuel cell system that can efficiently humidify a reaction gas without increasing the number of parts.

To achieve such an object, one aspect of the present invention provides a fuel cell system (1), comprising: a reaction gas supply unit (5, 6) configured to supply a reaction gas to a fuel cell stack (4); a humidifier (46) configured to transfer moisture from an off-gas discharged from the fuel cell stack to the reaction gas; and a controller (8) configured to control the reaction gas supply unit so as to regulate a supply amount of the reaction gas to the fuel cell stack, wherein the controller is configured to acquire a temperature of the humidifier and set the supply amount of the reaction gas based on a target power generation amount of the fuel cell stack, and in a case where the temperature of the humidifier is equal to or lower than a prescribed warm-up determination value, the controller executes warm-up control to increase the supply amount of the reaction gas as compared with a case where the temperature of the humidifier is higher than the warm-up determination value.

According to this aspect, it is possible to provide a fuel cell system that can efficiently humidify the reaction gas without increasing the number of parts. When the warm-up control is executed, the amount of the off-gas supplied to the humidifier increases, and thus the amount of heat supplied to the humidifier increases. Accordingly, it is possible to quickly heat the humidifier and thus to efficiently humidify the reaction gas. This method makes it unnecessary to provide the humidifier with a heater or the like, so that the number of parts does not increase.

In the above aspect, preferably, the fuel cell system further comprises: a refrigerant circulation passage (65) for causing a refrigerant to flow through the fuel cell stack; and a refrigerant temperature acquiring unit (75, 76) configured to acquire a temperature of the refrigerant flowing through the refrigerant circulation passage, wherein the controller is configured to estimate the temperature of the humidifier based on the temperature of the refrigerant.

According to this aspect, it is possible to acquire the temperature of the humidifier without providing the humidifier with a temperature sensor. Accordingly, it is possible to reduce the number of parts.

In the above aspect, preferably, the refrigerant temperature acquiring unit is configured to acquire the temperature of the refrigerant flowing into the fuel cell stack, and the controller is configured to set an initial value of the temperature of the humidifier based on the temperature of the refrigerant flowing into the fuel cell stack at a start of power generation and execute the warm-up control in a case where the initial value is equal to or less than the warm-up determination value.

According to this aspect, it is possible to acquire the initial value of the temperature of the humidifier.

In the above aspect, preferably, the fuel cell system further comprises an electric current acquiring unit (77) configured to acquire a power generation current of the fuel cell stack, wherein the refrigerant temperature acquiring unit is configured to acquire the temperature of the refrigerant discharged from the fuel cell stack, and the controller is configured to acquire a changing amount of the temperature of the humidifier in a prescribed period based on the power generation current and the temperature of the refrigerant discharged from the fuel cell stack and estimate the temperature of the humidifier based on the initial value of the temperature of the humidifier and the changing amount.

According to this aspect, it is possible to accurately estimate the temperature of the humidifier.

In the above aspect, preferably, the reaction gas supply unit includes a fuel gas supply unit (5) configured to supply a fuel gas to the fuel cell stack and an oxidizer gas supply unit (6) configured to supply an oxidizer gas to the fuel cell stack, the oxidizer gas supply unit is provided with the humidifier, and in a case where the temperature of the humidifier is equal to or lower than the warm-up determination value, the controller controls the oxidizer gas supply unit to increase a supply amount of the oxidizer gas as compared with a case where the temperature of the humidifier is higher than the warm-up determination value.

According to this aspect, it is possible to efficiently humidify the oxidizer gas without increasing the number of parts.

Thus, according to the above aspects, it is possible to provide a fuel cell system that can efficiently humidify a reaction gas without increasing the number of parts.

DETAILED DESCRIPTION OF THE INVENTION

Figure 1:
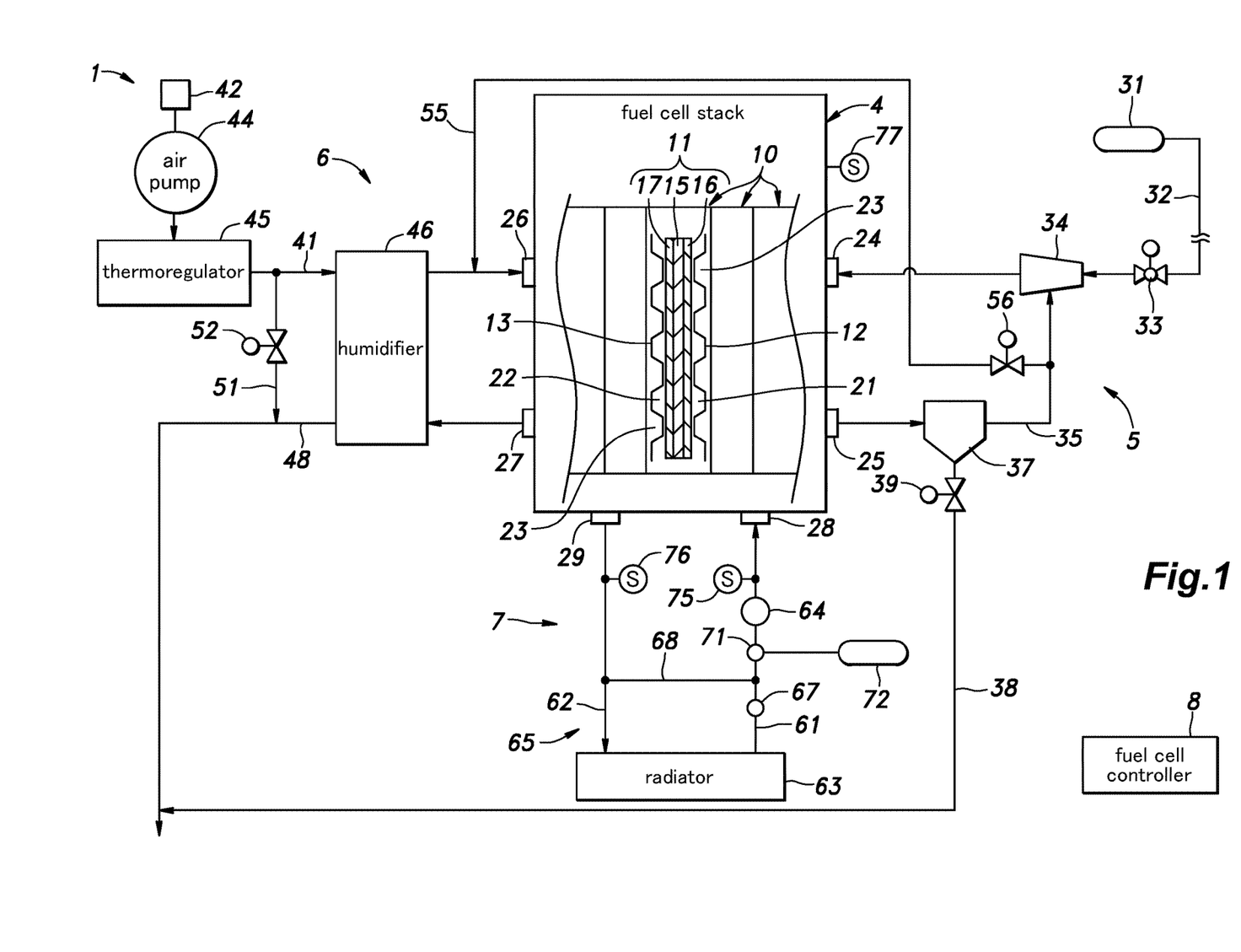
FIG. 1 is a block diagram of a fuel cell system.

In the following, a fuel cell system 1 according to an embodiment of the present invention will be described. The fuel cell system 1 is mounted on a vehicle 2. As shown in FIG. 1, the fuel cell system 1 includes a fuel cell stack 4, a fuel gas supply device 5 as a fuel gas supply unit configured to supply a fuel gas to the fuel cell stack 4, an oxidizer gas supply device 6 as an oxidizer gas supply unit configured to supply an oxidizer gas to the fuel cell stack 4, a refrigerant supply device 7 configured to supply a refrigerant to the fuel cell stack 4, and a fuel cell controller 8. In the present embodiment, the fuel gas is a hydrogen gas, and the oxidizer gas is air. The fuel gas and the oxidizer gas may be also referred to as "reaction gas". The fuel gas supply device 5 and the oxidizer gas supply device 6 constitute a reaction gas supply unit. Further, the oxidizer gas supply device 6 constitutes an oxidizer gas supply unit.

The fuel cell stack 4 includes a plurality of power generation cells 10 stacked one by one. Each power generation cell 10 includes an electrolyte membrane and electrode structure 11 (hereinafter simply referred to as "structure 11"), and a first separator 12 and a second separator 13 configured to hold the structure 11 therebetween. The first separator 12 and the second separator 13 may be made of metal or carbon.

The structure 11 includes a solid polymer electrolyte membrane 15 (hereinafter simply referred to as "electrolyte membrane 15"), and an anode 16 (electrode) and a cathode 17 (electrode) configured to hold the electrolyte membrane 15 therebetween. The electrolyte membrane 15 may consist of a thin membrane of a fluorine-based electrolyte such as perfluorosulfonic acid containing moisture. Alternatively, the electrolyte membrane 15 may consist of a thin membrane of a hydrocarbon-based electrolyte.

Between the first separator 12 and the structure 11, a plurality of hydrogen gas passages 21 for supplying the hydrogen gas to the anode 16 is formed. Between the second separator 13 and the structure 11, a plurality of air passages 22 for supplying the air to the cathode 17 is formed. Between the first separator 12 and the second separator 13 adjacent to each other, a plurality of refrigerant passages 23 through which the refrigerant passes is formed.

The fuel cell stack 4 is provided with a hydrogen gas inlet 24, a hydrogen gas outlet 25, an air inlet 26, an air outlet 27, a refrigerant inlet 28, and a refrigerant outlet 29. The hydrogen gas inlet 24 is connected to a supply side (a side to which the hydrogen gas is supplied) of each hydrogen gas passage 21. The hydrogen gas outlet 25 is connected to a discharge side (a side from which the hydrogen gas is discharged) of each hydrogen gas passage 21. The air inlet 26 is connected to a supply side (a side to which the air is supplied) of each air passage 22. The air outlet 27 is connected to a discharge side (a side from which the air is discharged) of each air passage 22. The refrigerant inlet 28 is connected to a supply side (a side to which the refrigerant is supplied) of each refrigerant passage 23. The refrigerant outlet 29 is connected to a discharge side (a side from which the refrigerant is discharged) of each refrigerant passage 23.

The fuel gas supply device 5 includes a hydrogen tank 31 configured to store a high-pressure hydrogen gas. The hydrogen tank 31 is connected to the hydrogen gas inlet 24 of the fuel cell stack 4 via a hydrogen gas supply passage 32. The hydrogen gas supply passage 32 is provided with an injector 33 and an ejector 34 that are arranged in series. When the pressure inside the ejector 34 becomes negative, the ejector 34 sucks the hydrogen gas from a hydrogen gas discharge passage 35.

To the hydrogen gas outlet 25 of the fuel cell stack 4, the hydrogen gas discharge passage 35 is connected. The hydrogen gas discharge passage 35 is configured to discharge an anode off-gas (discharge hydrogen gas), which is the hydrogen gas at least partially used in the anode 16, from the fuel cell stack 4. The hydrogen gas discharge passage 35 is connected to the ejector 34.

The hydrogen gas discharge passage 35 is provided with a gas-liquid separation device 37. The gas-liquid separation device 37 is configured to separate a liquid from the anode off-gas and discharge the separated liquid to a drain passage 38. The drain passage 38 is provided with a drain valve 39. The gas separated by the gas-liquid separation device 37 is sucked into the ejector 34 via the hydrogen gas discharge passage 35.

The oxidizer gas supply device 6 is provided with an air supply passage 41. At one end of the air supply passage 41, an air intake port 42 for introducing air from the atmosphere (outside) is provided. The other end of the air supply passage 41 is connected to the air inlet 26 of the fuel cell stack 4. The air supply passage 41 is provided with an air pump 44, a thermoregulator 45, and a humidifier 46 that are arranged in series and in order of the air pump 44, the thermoregulator 45, and the humidifier 46 from a side of the air intake port 42. The air pump 44 consists of a compressor driven by an electric motor. The thermoregulator 45 may consist of a heater including a heating wire.

To the air outlet 27 of the fuel cell stack 4, an air discharge passage 48 is connected. The air discharge passage 48 is configured to discharge a cathode off-gas, which is compressed air at least partly used in the cathode 17, from the fuel cell stack 4.

The air discharge passage 48 is provided with the humidifier 46. In the humidifier 46, the compressed air supplied from the air pump 44 and the cathode off-gas exchange moisture and heat. That is, the humidifier 46 is configured to transfer moisture from the cathode off-gas (off-gas) discharged from the fuel cell stack 4 to the compressed air (reaction gas). The cathode off-gas discharged from the fuel cell stack 4 has a higher temperature and higher humidity than the compressed air passing through the air supply passage 41. Accordingly, the temperature and humidity of the compressed air supplied from the air pump 44 increase in the humidifier 46. The humidifier 46 may consist of a membrane filter humidifier using a hollow fiber membrane. The humidifier 46 may be provided with one passage through which the compressed air passes and another passage through which the cathode off-gas passes, and these two passages may be separated by the hollow fiber membrane.

A portion of the air supply passage 41 between the thermoregulator 45 and the humidifier 46 and a portion of the air discharge passage 48 on a downstream side of the humidifier 46 are connected via an air bypass passage 51. The air bypass passage 51 is provided with an air flow rate regulation valve 52 configured to regulate a flow rate of the air flowing through the air bypass passage 51. To a downstream portion of the air discharge passage 48, the drain passage 38 is connected. An outlet of the air discharge passage 48 is configured to discharge the cathode off-gas and the liquid separated from the anode off-gas to the outside.

A portion of the hydrogen gas discharge passage 35 between the gas-liquid separation device 37 and the ejector 34 and a portion of the air supply passage 41 between the humidifier 46 and the air inlet 26 are connected via an anode off-gas intake passage 55. The anode off-gas intake passage 55 is provided with an on/off valve 56. The anode off-gas intake passage 55 is configured to supply the anode off-gas to the air supply passage 41.

The refrigerant supply device 7 includes a refrigerant supply passage 61 connected to the refrigerant inlet 28 of the fuel cell stack 4, a refrigerant discharge passage 62 connected to the refrigerant outlet 29 of the fuel cell stack 4, and a radiator 63 connected to the refrigerant supply passage 61 and the refrigerant discharge passage 62. The refrigerant supply passage 61 is provided with a refrigerant circulation pump 64 configured to circulate the refrigerant. The refrigerant supply passage 61, the refrigerant discharge passage 62, and the radiator 63 constitute a refrigerant circulation passage 65 through which the refrigerant circulates. The refrigerant circulation passage 65 is connected to the fuel cell stack 4.

In a portion of the refrigerant supply passage 61 between the radiator 63 and the refrigerant circulation pump 64, a thermostat valve 67 is provided. The thermostat valve 67 is opened when the refrigerant flowing through the refrigerant supply passage 61 is at a relatively high temperature, and is closed when the refrigerant flowing therethrough is at a relatively low temperature. The refrigerant discharge passage 62 and the refrigerant supply passage 61 are connected via a refrigerant bypass passage 68 that bypasses the radiator 63 and the thermostat valve 67. The refrigerant bypass passage 68 is connected to a portion of the refrigerant supply passage 61 between the thermostat valve 67 and the refrigerant circulation pump 64. When the thermostat valve 67 is closed, the refrigerant flows from the refrigerant discharge passage 62 to the refrigerant supply passage 61 via the refrigerant bypass passage 68.

To a portion of the refrigerant supply passage 61 between the thermostat valve 67 and the refrigerant circulation pump 64, a reserve tank 72 is connected via a regulation valve 71. More specifically, the reserve tank 72 may be connected, via the regulation valve 71, to a portion of the refrigerant supply passage 61 between a portion connected to the refrigerant bypass passage 68 and the refrigerant circulation pump 64. Hereinafter, the pressure of the refrigerant at a portion of the refrigerant supply passage 61 connected to an inlet of the refrigerant circulation pump 64 will be referred to as "pump inlet pressure". The regulation valve 71 is opened when the pump inlet pressure becomes equal to or lower than a prescribed first pressure. Accordingly, the refrigerant is supplied from the reserve tank 72 to the refrigerant supply passage 61. Also, the regulation valve 71 is opened when the pump inlet pressure becomes equal to or higher than a prescribed second pressure that is higher than the first pressure. Accordingly, the refrigerant is discharged from the refrigerant supply passage 61 to the reserve tank 72.

The refrigerant supply passage 61 and the refrigerant discharge passage 62 are made of resin or rubber to prevent the elution of metal ions into cooling water and to maintain the insulation of the refrigerant.

A portion of the refrigerant supply passage 61 between the refrigerant inlet 28 and the refrigerant circulation pump 64 is provided with a plurality of inlet temperature sensors 75 configured to detect a temperature of the refrigerant. Each inlet temperature sensor 75 is configured to detect the temperature of the refrigerant flowing into the refrigerant inlet 28. A portion of the refrigerant discharge passage 62 between the refrigerant outlet 29 and the refrigerant bypass passage 68 is provided with a plurality of outlet temperature sensors 76 configured to detect the temperature of the refrigerant. Each outlet temperature sensor 76 is configured to detect the temperature of the refrigerant flowing out of the refrigerant outlet 29. The plurality of inlet temperature sensors 75 and the plurality of outlet temperature sensors 76 are provided redundantly. The inlet temperature sensors 75 and the outlet temperature sensors 76 function as a refrigerant temperature acquiring unit.

The fuel cell stack 4 is provided with an electric current sensor 77 as an electric current acquiring unit configured to measure (acquire) a power generation current of the fuel cell stack 4.

Figure 2:
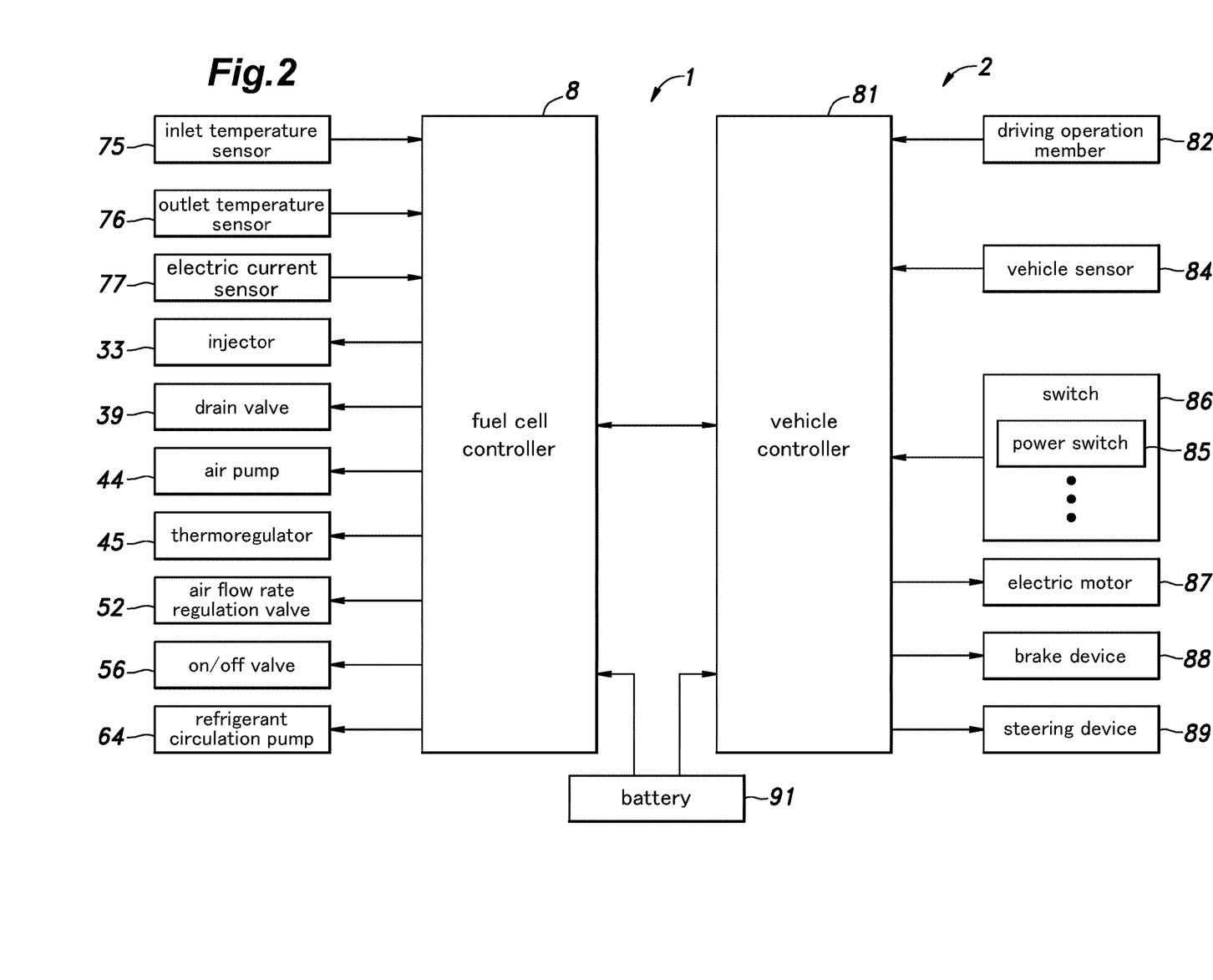
FIG. 2 is a block diagram of the fuel cell system.

The fuel cell controller 8 consists of an electronic control unit (ECU) including a CPU, non-volatile memory (read-only memory: ROM), volatile memory (random-access memory: RAM), and the like. As shown in FIG. 2, the fuel cell controller 8 is configured to control the air pump 44, the injector 33, the refrigerant circulation pump 64, the on/off valve 56, the drain valve 39, the air flow rate regulation valve 52, and the thermoregulator 45.

The fuel cell controller 8 is connected to a vehicle controller 81 configured to control traveling of the vehicle 2. Like the fuel cell controller 8, the vehicle controller 81 consists of an electronic control unit (ECU) including a CPU, non-volatile memory, volatile memory, and the like. The vehicle controller 81 is configured to control an electric motor 87 as a drive source, a brake device 88, and a steering device 89 based on signals from a driving operation member 82 such as an accelerator pedal, a brake pedal, and a steering wheel, a vehicle sensor 84 such as a vehicle speed sensor and a temperature sensor, and a switch 86 such as a power switch 85 (ignition switch). The fuel cell controller 8 and the vehicle controller 81 may be formed integrally. The fuel cell controller 8 and the vehicle controller 81 are connected to a battery 91.

The power switch 85 is turned on and off by a user. The vehicle controller 81 switches a power supply state of the vehicle 2 based on signals from the power switch 85. More specifically, when the power switch 85 is turned on, the vehicle controller 81 sets the power supply state to "ON", thereby enabling the power supply from the fuel cell stack 4 and the battery 91 to the electric motor 87. On the other hand, when the power switch 85 is turned off, the vehicle controller 81 sets the power supply state to "OFF", thereby prohibiting the power supply from the fuel cell stack 4 and the battery 91 to the electric motor 87.

The vehicle controller 81 is configured to determine a request driving force of the vehicle 2 (more specifically, the electric motor 87) and control the electric motor 87 based on the request driving force. For example, the vehicle controller 81 may determine the request driving force based on a pressing amount of the accelerator pedal. Further, the vehicle controller 81 may determine the request driving force based on both the pressing amount of the accelerator pedal and the vehicle speed. Alternatively, the vehicle controller 81 may be configured to execute autonomous driving control and determine the request driving force based on the action plan created therefor.

The fuel cell controller 8 receives information on the request driving force and the power supply state from the vehicle controller 81. Further, the fuel cell controller 8 is connected to the inlet temperature sensors 75 and the outlet temperature sensors 76 and configured to receive signals relating to the temperature of the refrigerant from the inlet temperature sensors 75 and the outlet temperature sensors 76. Further, the fuel cell controller 8 is connected to the electric current sensor 77 and configured to receive signals relating to the power generation current from the electric current sensor 77. The fuel cell controller 8 is configured to control the fuel gas supply device 5 and the oxidizer gas supply device 6 as a reaction gas supply unit based on various input signals so as to regulate a supply amount of the reaction gas to the fuel cell stack 4.

The fuel cell controller 8 is configured to execute traveling period power generation control to supply power (electric power) required for causing the vehicle 2 to travel. In the traveling period power generation control, the fuel cell controller 8 determines a target power generation amount of the fuel cell stack 4 based on the request driving force. The relationship between the request driving force and the target power generation amount of the fuel cell stack 4 may be defined by a map. Further, the fuel cell controller 8 determines, based on the target power generation amount, a flow rate (hereinafter referred to as "hydrogen gas flow rate") of the hydrogen gas as a fuel gas supplied to the fuel cell stack 4 and a flow rate (hereinafter referred to as "air flow rate") of the air as an oxidizer gas supplied to the fuel cell stack 4. Then, the fuel cell controller 8 determines an opening degree of the injector 33 and a driving amount of the air pump 44 based on the hydrogen gas flow rate and the air flow rate. The relationship between the target power generation amount and the hydrogen gas flow rate and the relationship between the target power generation amount and the air flow rate may be defined by a map. Further, the relationship between the hydrogen gas flow rate and the opening degree of the injector 33 may be defined by a map, and the relationship between the air flow rate and the driving amount of the air pump 44 may be defined by a map. The fuel cell controller 8 controls the injector 33 and the air pump 44 based on the opening degree of the injector 33 and the driving amount of the air pump 44, and thus supplies the hydrogen gas and the air to the fuel cell stack 4. Accordingly, a redox reaction occurs in the fuel cell stack 4, and thus the power is generated by the fuel cell stack 4. By the traveling period power generation control executed by the fuel cell controller 8, the fuel cell stack 4 changes the target power generation amount according to the request driving force of the vehicle 2.

When the vehicle 2 is stopped and a remaining amount of the battery 91 is equal to or less than a prescribed value, the fuel cell controller 8 executes stopped period power generation control to charge the battery 91. More specifically, when the vehicle speed is equal to or lower than a stop determination value and an SOC of the battery 91 is equal to or less than a prescribed SOC determination value, the fuel cell controller 8 executes the stopped period power generation control. The stop determination value is set to a vehicle speed at which the vehicle 2 can be regarded as being stopped. The SOC determination value is a value set for determining that the battery 91 needs to be charged. In the stopped period power generation control, the fuel cell controller 8 sets a prescribed target power generation amount, and determines the opening degree of the injector 33 and the driving amount of the air pump 44 based on the target power generation amount. The fuel cell controller 8 controls the injector 33 and the air pump 44 based on the opening degree of the injector 33 and the driving amount of the air pump 44, and thus supplies the hydrogen gas and the air to the fuel cell stack 4. Accordingly, a redox reaction occurs in the fuel cell stack 4, and thus the power is generated by the fuel cell stack 4.

In the traveling period power generation control and the stopped period power generation control, the fuel cell controller 8 acquires the temperature of the humidifier 46, and sets the supply amount of the reaction gas based on the target power generation amount of the fuel cell stack 4. In a case where the temperature of the humidifier 46 is equal to or lower than a prescribed warm-up determination value TL, the fuel cell controller 8 executes warm-up control to increase the supply amount of the reaction gas as compared with a case where the temperature of the humidifier 46 is higher than the warm-up determination value TL. In the present embodiment, in a case where the temperature of the humidifier 46 is equal to or lower than the warm-up determination value TL, the fuel cell controller 8 controls the oxidizer gas supply device 6 to increase the supply amount of the compressed air as an oxidizer gas as compared with a case where the temperature of the humidifier 46 is higher than the warm-up determination value TL.

The fuel cell controller 8 may estimate the temperature of the humidifier 46 based on at least one of a temperature of the refrigerant (hereinafter referred to as "the refrigerant temperature") at the refrigerant inlet 28 detected by each inlet temperature sensor 75 and the refrigerant temperature at the refrigerant outlet 29 detected by each outlet temperature sensor 76. More specifically, the fuel cell controller 8 may estimate the temperature of the humidifier 46 based on the refrigerant temperature at the refrigerant inlet 28 detected by the inlet temperature sensor 75, the refrigerant temperature at the refrigerant outlet 29 detected by the outlet temperature sensor 76, and the power generation current detected by the electric current sensor 77.

In the present embodiment, the fuel cell controller 8 sets an initial value of the temperature of the humidifier 46 based on the refrigerant temperature at the refrigerant inlet 28 at the start of the power generation control including the traveling period power generation control and the stopped period power generation control, namely, at the start of power generation. The abovementioned "temperature of the humidifier 46" means the temperature of the humidifier 46 at an outlet of the compressed air thereof. The fuel cell controller 8 may set the initial value of the temperature of the humidifier 46 based on the temperature of the refrigerant inlet 28 by using an initial value map that defines the relationship between the temperature of the refrigerant inlet 28 and the initial value of the temperature of the humidifier 46. The initial value map defines the relationship therebetween such that the initial value of the temperature of the humidifier 46 increases as the temperature of the refrigerant inlet 28 increases. The initial value map may be created based on experience.

Further, each time a prescribed period elapses, the fuel cell controller 8 acquires a changing amount of the temperature of the humidifier 46 in the prescribed period based on the refrigerant temperature at the refrigerant outlet 29 and the power generation current. The fuel cell controller 8 may set the changing amount of the temperature of the humidifier 46 in the prescribed period based on the refrigerant temperature at the refrigerant outlet 29 and the power generation current by using a changing amount map that defines the relationship between the refrigerant temperature at the refrigerant outlet 29, the power generation current, and the changing amount of the temperature of the humidifier 46 in the prescribed period. The prescribed period may be set to, for example, one second. The changing amount map may be created based on experience.

The fuel cell controller 8 acquires the temperature of the humidifier 46 at an arbitrary time based on the initial value of the temperature of the humidifier 46 and the changing amount of the temperature of the humidifier 46 in the prescribed period. The fuel cell controller 8 may acquire the current temperature of the humidifier 46 by adding the changing amount of the temperature of the humidifier 46 in the prescribed period from the last time to the current time to the temperature of the humidifier 46 acquired the last time.

In another embodiment, the humidifier 46 may be provided with a temperature sensor configured to detect the temperature of the outlet of the compressed air thereof, and the fuel cell controller 8 may acquire the temperature of the humidifier 46 based on the signals from the temperature sensor of the humidifier 46. Further, the fuel cell controller 8 may acquire the temperature of the humidifier 46 according to experience based on the refrigerant temperature at the refrigerant inlet 28, the refrigerant temperature at the refrigerant outlet 29, and the power generation current.

The fuel cell controller 8 starts the warm-up control in a case where the temperature of the humidifier 46 is equal to or lower than the warm-up determination value TL. The fuel cell controller 8 may start the warm-up control in a case where the initial value of the temperature of the humidifier 46 is equal to or lower than the warm-up determination value TL. In the warm-up control, the fuel cell controller 8 increases the air flow rate (the fuel cell controller 8 sets the air flow rate higher) as compared with a case where the warm-up control is not executed (a case where the temperature of the humidifier 46 is higher than the warm-up determination value TL). For example, in the warm-up control, the fuel cell controller 8 may increase the air flow rate by a prescribed value as compared with a case where the warm-up control is not executed. Further, in the warm-up control, the fuel cell controller 8 may set the air flow rate to be increased based on the temperature of the humidifier 46. For example, the air flow rate to be increased may be set to increase as the temperature of the humidifier 46 decreases.

Figure 3:
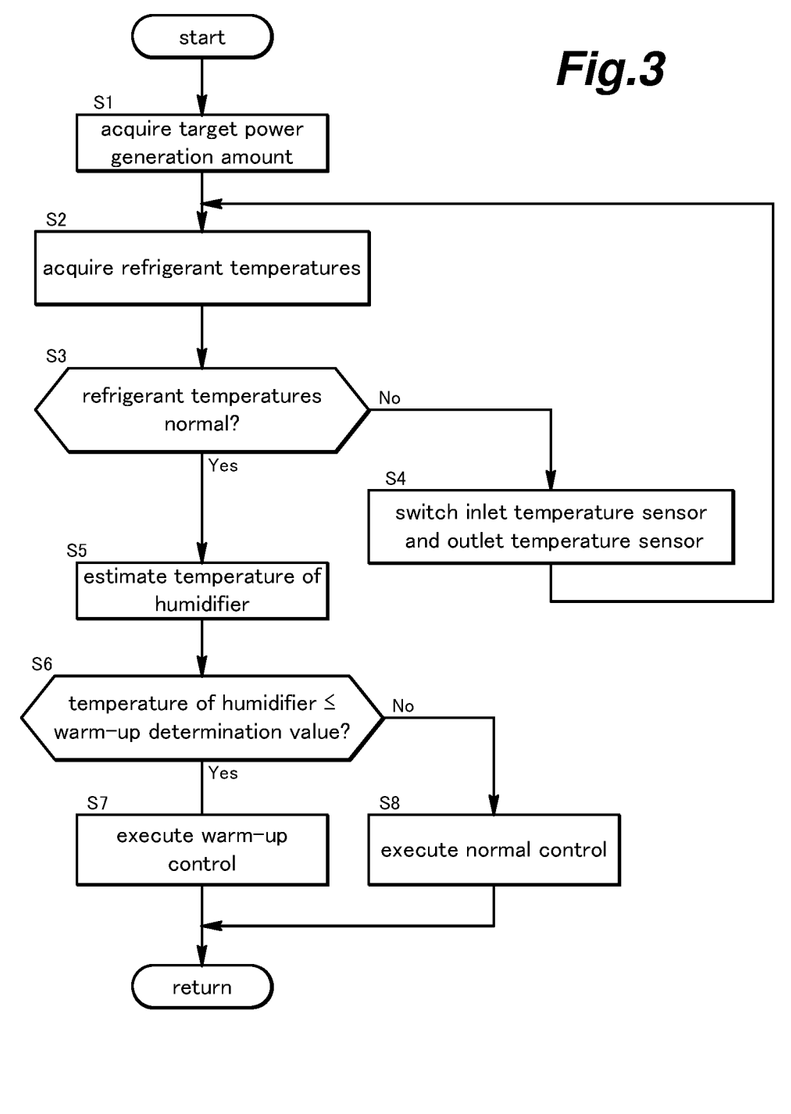
FIG. 3 is a flowchart showing the procedure of power generation control executed by a fuel cell controller.

Next, the procedure of the power generation control by the fuel cell controller 8 will be described with reference to FIG. 3. The power generation control includes the traveling period power generation control and the stopped period power generation control. The fuel cell controller 8 starts, based on the acquired power supply state, the power generation control when the power supply state becomes "ON". The fuel cell controller 8 executes the power generation control at prescribed time intervals. First, the fuel cell controller 8 acquires the target power generation amount (S1). In a case where the traveling period power generation control is executed, the target power generation amount may be set based on the request driving force and the like. In a case where the stopped period power generation control is executed, a prescribed value may be set to the target power generation amount.

Next, the fuel cell controller 8 acquires the refrigerant temperature at the refrigerant inlet 28 based on the signal from the inlet temperature sensor 75 in use, and acquires the refrigerant temperature at the refrigerant outlet 29 based on the signal from the outlet temperature sensor 76 in use (S2).

Next, the fuel cell controller 8 determines whether the refrigerant temperature at the refrigerant inlet 28 and the refrigerant temperature at the refrigerant outlet 29 are normal (S3). For example, the fuel cell controller 8 may determine that the refrigerant temperature at the refrigerant inlet 28 and the refrigerant temperature at the refrigerant outlet 29 are normal in a case where the refrigerant temperature at the refrigerant inlet 28 and the refrigerant temperature at the refrigerant outlet 29 are within a prescribed proper range.

In a case where the refrigerant temperature at the refrigerant inlet 28 and the refrigerant temperature at the refrigerant outlet 29 are not normal (in a case where the determination result of S3 is No), the fuel cell controller 8 switches from the inlet temperature sensor 75 and the outlet temperature sensor 76 that are in use to another inlet temperature sensor 75 and another outlet temperature sensor 76 that are provided redundantly (S4). Then, the fuel cell controller 8 executes the processes of S2 and S3 again.

In a case where the refrigerant temperature at the refrigerant inlet 28 and the refrigerant temperature at the refrigerant outlet 29 are normal (in a case where the determination result of S3 is Yes), the fuel cell controller 8 estimates the temperature of the humidifier 46 based on the refrigerant temperature at the refrigerant inlet 28, the refrigerant temperature at the refrigerant outlet 29, and the power generation current (S5). As described above, the fuel cell controller 8 may acquire the initial value of the temperature of the humidifier 46 based on the refrigerant temperature at the refrigerant inlet 28, acquire the changing amount of the temperature of the humidifier 46 based on the refrigerant temperature of the refrigerant outlet 29 and the power generation current, and estimate the temperature of the humidifier 46 based on the initial value of the temperature of the humidifier 46 and the changing amount of the temperature of the humidifier 46.

Next, the fuel cell controller 8 determines whether the temperature of the humidifier 46 is equal to or lower than the warm-up determination value TL (S6).

In a case where the temperature of the humidifier 46 is equal to or lower than the warm-up determination value TL (in a case where the determination result of S6 is Yes), the fuel cell controller 8 executes the warm-up control (S7). In the warm-up control, the fuel cell controller 8 sets the hydrogen gas flow rate and the air flow rate based on the target power generation amount. Then, the fuel cell controller 8 sets an increase of the air flow rate. The increase of the air flow rate may be a prescribed value set in advance. Then, the fuel cell controller 8 sets an air flow rate correction value by adding the increase to the air flow rate set based on the target power generation amount, sets the driving amount of the air pump 44 based on the air flow rate correction value, and thus controls the air pump 44. Further, the fuel cell controller 8 sets the opening degree of the injector 33 based on the hydrogen gas flow rate set based on the target power generation amount, and thus controls the injector 33.

In a case where the temperature of the humidifier 46 is higher than the warm-up determination value TL (in a case where the determination result of S6 is No), the fuel cell controller 8 executes the normal control (S8). In the normal control, the fuel cell controller 8 sets the hydrogen gas flow rate and the air flow rate based on the target power generation amount. Then, the fuel cell controller 8 sets the driving amount of the air pump 44 based on the air flow rate, and thus controls the air pump 44. Further, the fuel cell controller 8 sets the opening degree of the injector 33 based on the hydrogen gas flow rate set based on the target power generation amount, and thus controls the injector 33.

Figure 4:
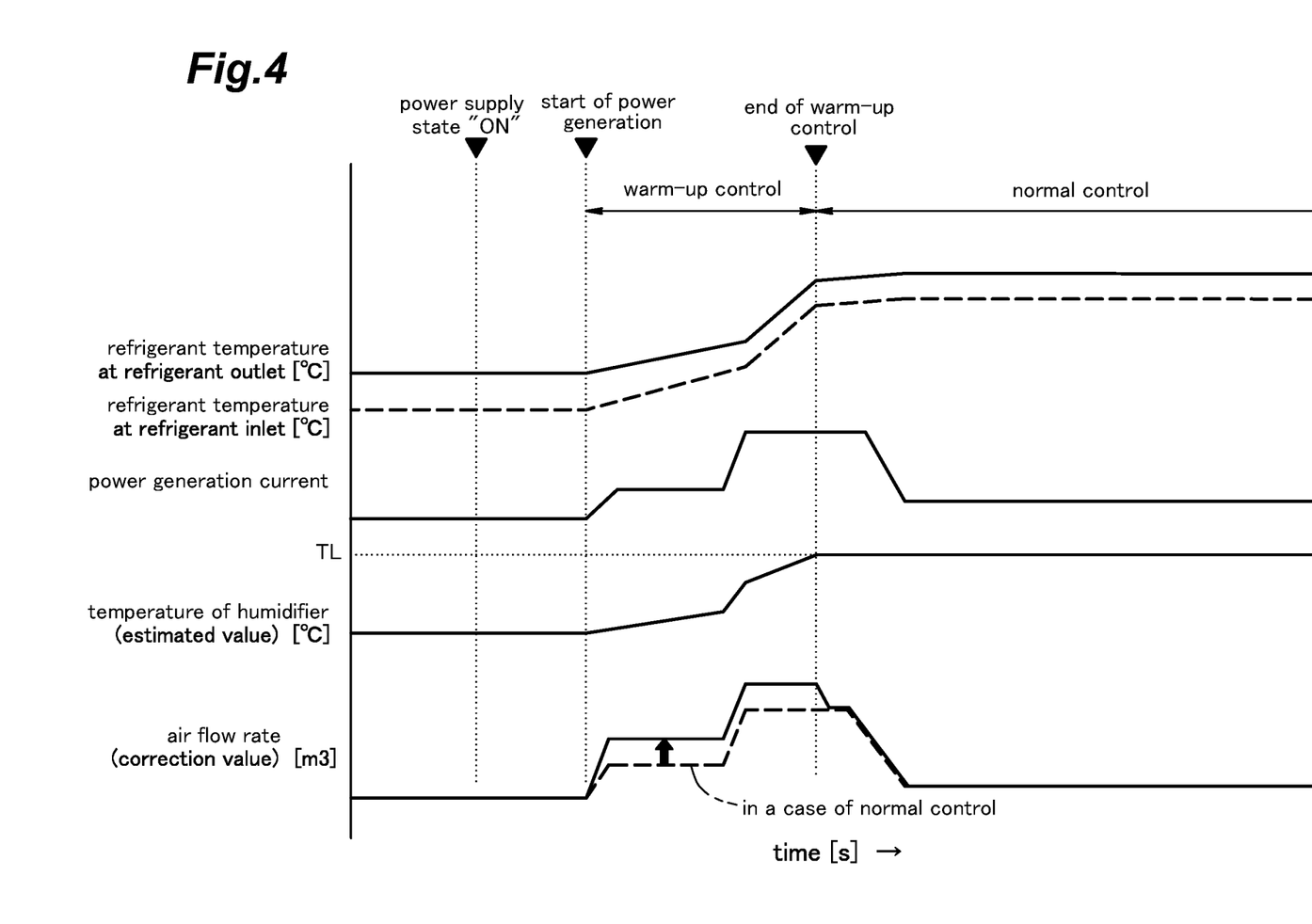
FIG. 4 is a timing diagram showing the relationship between refrigerant temperatures, a power generation current, a temperature of a humidifier, and an air flow rate correction value in the power generation control.

According to the above configurations, the fuel cell controller 8 executes the warm-up control in a case where the temperature of the humidifier 46 is equal to or lower than the warm-up determination value TL. Accordingly, as shown in FIG. 4, at the time the warm-up control is being executed, the air flow rate of the compressed air supplied to the fuel cell stack 4 increases by a prescribed increase as compared with the time the normal control is being executed. In FIG. 4, a broken line indicates the air flow rate (the amount of the compressed air) in a case where it is assumed that the normal control is executed, and a solid line indicates the air flow rate (the amount of the compressed air) in a case where the warm-up control is executed. According to the warm-up control, the flow rate of the cathode off-gas discharged from the fuel cell stack 4 and passing through the humidifier 46 increases. Accordingly, the amount of heat the humidifier 46 receives from the cathode off-gas increases, and the rising speed of the temperature of the humidifier 46 increases. Accordingly, the temperature of the compressed air supplied from the humidifier 46 to the fuel cell stack 4 increases, and thus the saturated vapor pressure increases. As a result, the moisture contained in the compressed air supplied from the humidifier 46 to the fuel cell stack 4 increases. In this way, it is possible to quickly heat the humidifier 46 and thus to efficiently humidify the compressed air. The power generation current increases according to an increase in the request driving force. The refrigerant temperature at the refrigerant inlet 28 and the refrigerant temperature at the refrigerant outlet 29 increase according to power generation by the fuel cell stack 4.

Figure 5:
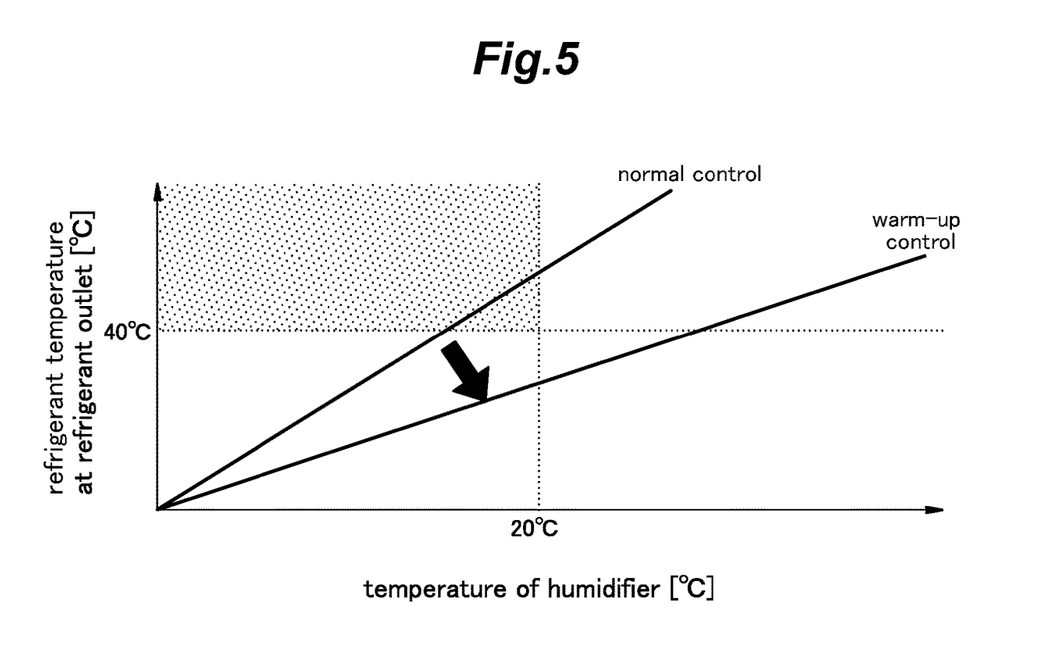
FIG. 5 is a graph showing the effect of warm-up control.

FIG. 5 is an explanatory diagram showing the relationship between the temperature of the humidifier 46 and the refrigerant temperature at the refrigerant outlet 29 in a case where the normal control and the warm-up control are executed. It is known that the durability of the fuel cell stack 4 may deteriorate in an area (see a dotted area in FIG. 5) where the temperature of the humidifier 46 is lower than 20° C. and the refrigerant temperature at the refrigerant outlet 29 is higher than 40° C. When the fuel cell controller 8 executes only the normal control in the power generation control, an increase in the temperature of the humidifier 46 is slow, and thus a line indicating the relationship between the temperature of the humidifier 46 and the refrigerant temperature at the refrigerant outlet 29 may pass through the abovementioned area where the durability of the fuel cell stack 4 may deteriorate. In the present embodiment, the fuel cell controller 8 executes the warm-up control in the power generation control, and thus the increase in the temperature of the humidifier 46 is faster as compared with a case where the normal control is executed. Accordingly, it is possible to prevent the durability of the fuel cell stack 4 from deteriorating.

The abovementioned method makes it unnecessary to provide the humidifier 46 with a heater or the like, and thus the number of parts does not increase. At the time the warm-up control is being executed, the hydrogen gas flow rate is set to the same value as the time the normal control is executed.

The fuel cell controller 8 ends the warm-up control when the temperature of the humidifier 46 becomes higher than the warm-up determination value TL, and executes the normal control.

In the present embodiment, the temperature of the humidifier 46 is estimated based on the refrigerant temperature at the refrigerant inlet 28, the refrigerant temperature at the refrigerant outlet 29, and the power generation current. Accordingly, it is possible to acquire the temperature of the humidifier 46 without providing the humidifier 46 with a temperature sensor. Accordingly, it is possible to reduce the number of parts. The fuel cell controller 8 acquires the current temperature of the humidifier 46 by adding the changing amount of the temperature of the humidifier 46 in the prescribed period acquired based on the refrigerant temperature at the refrigerant outlet 29 and the power generation current to the initial value of the temperature of the humidifier 46 acquired based on the refrigerant temperature at the refrigerant inlet 28. Accordingly, it is possible to accurately estimate the temperature of the humidifier 46.

Concrete embodiments of the present invention have been described in the foregoing, but the present invention should not be limited by the foregoing embodiments and various modifications and alterations are possible within the scope of the present invention. For example, a humidifier may be provided in the fuel gas supply device 5, and heat and moisture may be exchanged between the hydrogen gas supplied to the fuel cell stack 4 and the anode off-gas discharged from the fuel cell stack 4. In such a case, the fuel cell controller 8 may acquire the temperature of the humidifier provided in the fuel gas supply device 5, and execute the warm-up control in a case where the temperature of the humidifier provided in the fuel gas supply device 5 is equal to or lower than a prescribed warm-up determination value. In the warm-up control, the fuel cell controller 8 may increase the hydrogen gas flow rate as compared with a case where the normal control is executed.

The invention claimed is:

1. A fuel cell system, comprising:
a reaction gas supply unit configured to supply a reaction gas to a fuel cell stack;
a humidifier configured to transfer moisture from an off-gas discharged from the fuel cell stack to the reaction gas;
a controller configured to control the reaction gas supply unit so as to regulate a supply amount of the reaction gas to the fuel cell stack,
a refrigerant circulation passage for causing a refrigerant to flow through the fuel cell stack; and
a refrigerant temperature acquiring unit configured to acquire a temperature of the refrigerant flowing through the refrigerant circulation passage,
wherein the controller is configured to acquire a temperature of the humidifier and set the supply amount of the reaction gas based on a target power generation amount of the fuel cell stack,
in a case where the temperature of the humidifier is equal to or lower than a prescribed warm-up determination value, the controller executes warm-up control to increase the supply amount of the reaction gas as compared with a case where the temperature of the humidifier is higher than the prescribed warm-up determination value, and
the controller is configured to estimate the temperature of the humidifier based on the temperature of the refrigerant.

2. The fuel cell system according to claim 1, wherein the refrigerant temperature acquiring unit is configured to acquire a temperature of the refrigerant flowing into the fuel cell stack, and
the controller is configured to set an initial value of the temperature of the humidifier based on the temperature of the refrigerant flowing into the fuel cell stack at a start of power generation and execute the warm-up control in a case where the initial value is equal to or less than the prescribed warm-up determination value.

3. The fuel cell system according to claim 2, further comprising an electric current acquiring unit configured to acquire a power generation current of the fuel cell stack,
wherein the refrigerant temperature acquiring unit is configured to acquire a temperature of the refrigerant discharged from the fuel cell stack, and
the controller is configured to acquire a changing amount of the temperature of the humidifier in a prescribed period based on the power generation current and the temperature of the refrigerant discharged from the fuel cell stack and estimate the temperature of the humidifier based on the initial value of the temperature of the humidifier and the changing amount.

4. The fuel cell system according to claim 1, wherein the reaction gas supply unit includes a fuel gas supply unit configured to supply a fuel gas to the fuel cell stack and an oxidizer gas supply unit configured to supply an oxidizer gas to the fuel cell stack,
the oxidizer gas supply unit is provided with the humidifier, and
in a case where the temperature of the humidifier is equal to or lower than the prescribed warm-up determination value, the controller controls the oxidizer gas supply unit to increase a supply amount of the oxidizer gas as compared with a case where the temperature of the humidifier is higher than the prescribed warm-up determination value.

\* \* \* \* \*